Oct. 25, 1932.  G. R. AULD  1,884,964
METHOD AND APPARATUS FOR MAKING HEAT INTERCHANGERS
Filed April 24, 1930   7 Sheets-Sheet 6

George R. Auld INVENTOR
BY
Spencer Hardman & Fish ATTORNEYS

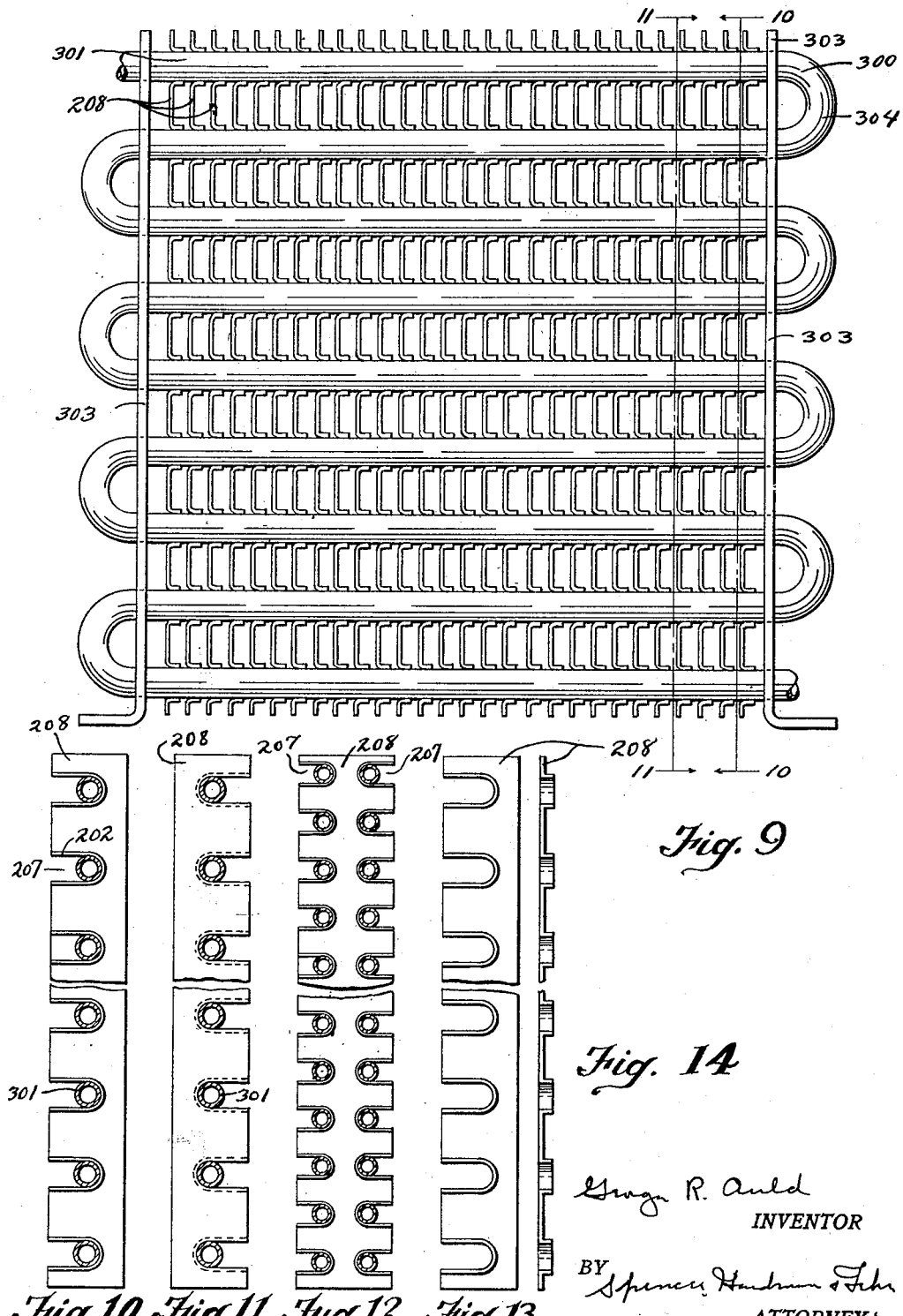

Patented Oct. 25, 1932

1,884,964

UNITED STATES PATENT OFFICE

GEORGE R. AULD, OF DAYTON, OHIO, ASSIGNOR TO FRIGIDAIRE CORPORATION, OF DAYTON, OHIO, A CORPORATION OF DELAWARE

METHOD AND APPARATUS FOR MAKING HEAT INTERCHANGERS

Application filed April 24, 1930. Serial No. 447,018.

This invention relates to refrigerating apparatus, and more particularly, to a method of and apparatus for use in the manufacture of finned heat exchange elements for use in refrigerating apparatus.

The primary purpose of this invention is to simplify the manufacture of finned heat exchange elements, such as for instance, refrigerating condensers by providing a machine capable of receiving at one end a strip or sheet of thin metal, and capable of acting thereon to produce at the outlet end of the machine, a series of strip fins prepared and ready to be attached to tubing to form a heat exchange element.

For another object, this invention contemplates simplifying the manufacture of finned heat exchange elements by reducing to a minimum the amount of manual labor required. For instance, by providing a machine which will not only act on the metal sheet fed thereinto to form the required strip fins, but which will also stack and arrange the completed strip fins for the reception of the condenser tubing.

A still further object of this invention is to provide an improved method of preparing strip fins for use in the manufacture of refrigerating condensers or any other heat exchange element.

Further objects and advantages of the present invention will be apparent from the following description, reference being had to the accompanying drawings, wherein a preferred form of the present invention is clearly shown.

In the drawings

Fig. 8 is a view partly in section of part of the cutting mechanism;

Fig. 9 is a plan view of a completed condenser;

Fig. 10 is a view in section taken on the line 10—10 of Fig. 9;

Fig. 11 is a view in section taken on the line 11—11 of Fig. 9;

Fig. 12 is a view in section on a line similar to the line 10—10 of Fig. 9 of a modified form of condenser;

Fig. 13 is a view in elevation of one of the completed strip fins, and

Fig. 14 is a view in end elevation of the completed strip fin.

Figure 1:
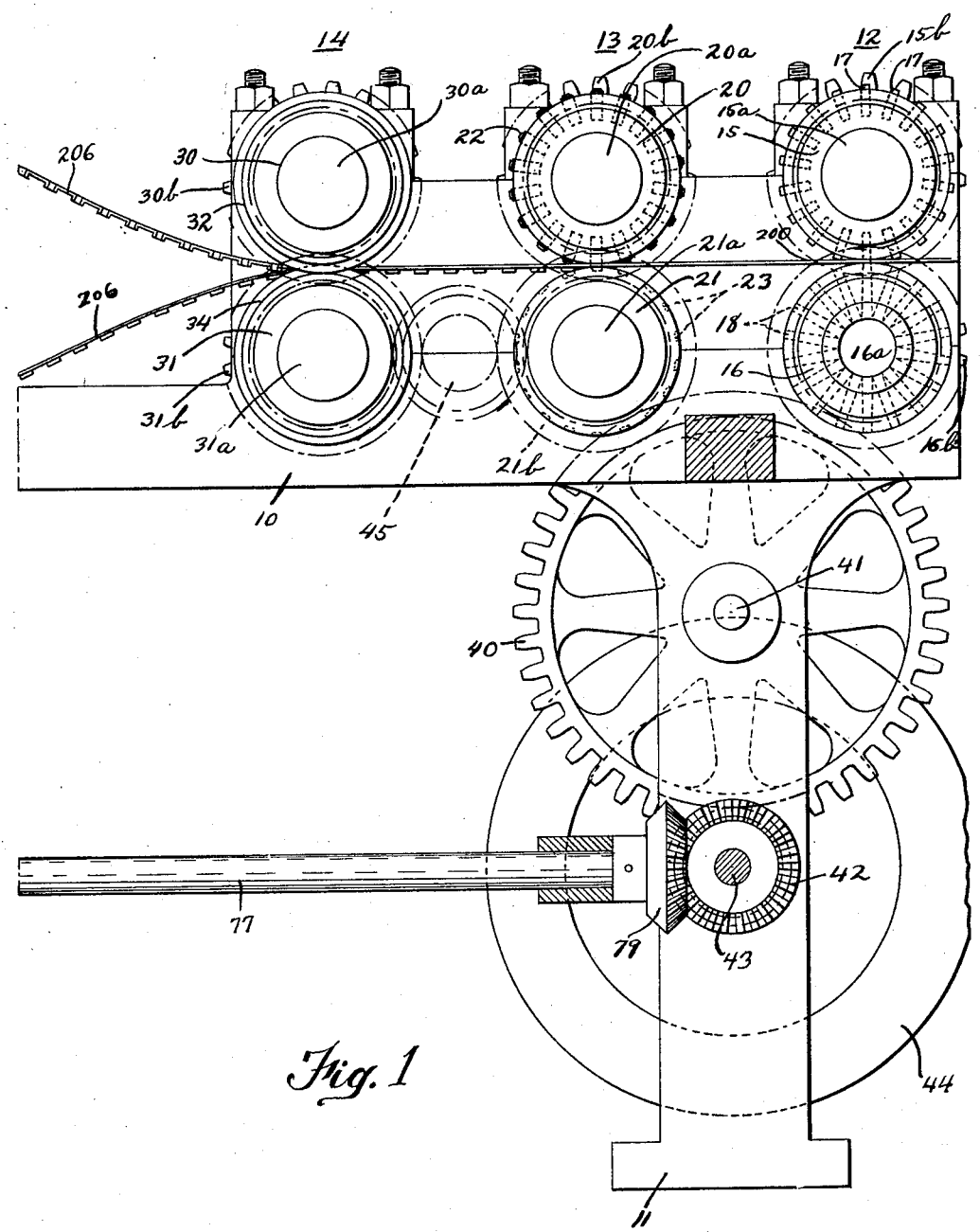
Fig. 1 is a view in section substantially on the line 1—1 of Fig. 3 of one section of a machine embodying features of this invention, certain parts being shown in elevation for clearness.

In the drawings, the machine disclosed is designed primarily to produce strip fins for use in the manufacture of condensers, which I term the "side entry type" of condenser. That is to say, to produce strip fins provided with notches extending inwardly from one edge thereof, and having the side edges of the notches turned back to provide flanges. This type of strip fin is particularly adaptable to refrigerating condensers, inasmuch as this type may be easily and readily assembled and reduces to a minimum the amount of wasted metal that must be removed from the strip fins. However, it should be understood that with slight modifications, this machine may be designed to produce fins or strip fins of other types.

Broadly, my improved method of manufacturing the strip fins comprises, feeding in at one end of the machine a strip or sheet of metal, and acting on the strip or sheet of metal, during its passage through the machine, to produce completed strip fins at the outlet end of the machine, such strip fins being prepared and ready for the reception of the condenser tubing.

As specifically illustrated, one embodiment of my improved method comprises feeding into the inlet end of the machine a sheet of relatively thin metal, continuously forming a series of rows of openings from the metal, bending back the side edges of the openings to form flanges, cutting the treated metal into long continuous strips, by cutting directly through the rows of openings and between the rows of openings, cutting the long continuous strips into the lengths desired and finally stacking the strip fins in a rack or other supporting device with the notches extending upwardly for the reception of the condenser tubing.

Broadly, the apparatus comprises a machine capable of receiving at its inlet end a strip or sheet of metal and capable of acting thereon to produce a plurality of strip fins prepared for attaching to metal tubing to complete a condenser or other heat exchange element.

The method specifically set forth may be modified slightly by eliminating the last named step and allowing the strip fins to be stacked in the rack by hand. Also the particular steps may be, to some extent, interchanged without modifying the device to any great extent.

Figure 3:
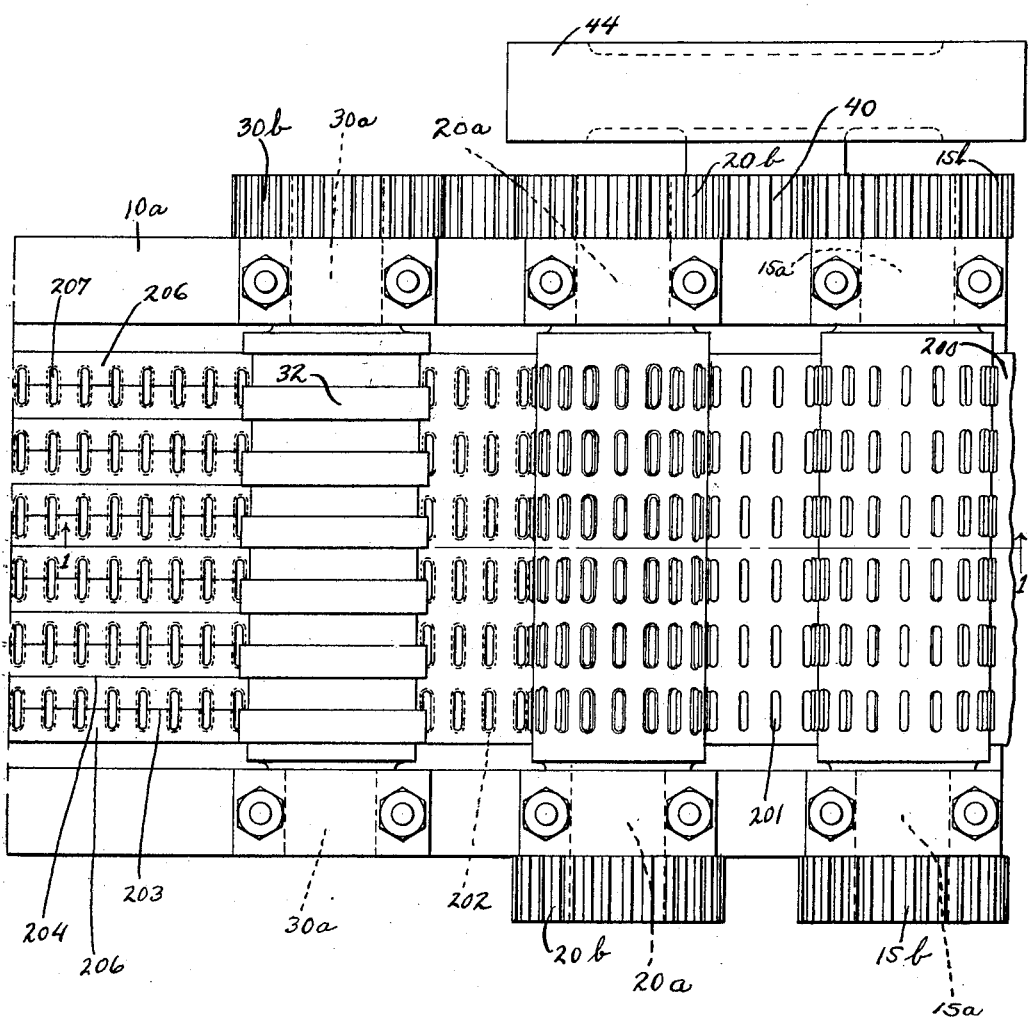
Fig. 3 is a plan view of the section of the machine shown in Fig. 1.

Referring to the drawings, the apparatus disclosed comprises a body portion 10, having side members 10a and cross members 10b, which are supported a suitable distance above the floor by means of the supporting frame 11 which may, or may not be integral with the body portion. As shown in Figs. 1 and 3 the right hand end of the body portion 10 supports the means 12 for removing the elongated sections from the sheet of metal, the means 13 for bending back the edges of the elongated openings to provide the side flanges, and the means 14 for cutting the relatively wide sheet of metal into long continuous strips.

The means 12 for removing the elongated sections from the sheet of metal comprises two rotating cylinders 15 and 16, the upper cylinder 15 being provided with a plurality of die members 17 arranged in rows on the periphery of the cylinder. The lower cylinder 16 is provided on its periphery with a plurality of depressions 18, also arranged in rows, and adapted to coincide with the die members 17 upon rotation of the two cylinders. The machine may be periodically stopped and the punchings may be removed from the drum 16.

The means 13 for forming the flanges by bending back the side edges of the elongated openings, also comprises two cylinders 20 and 21, the upper cylinders 20 being provided with a plurality of die members 22 also arranged in rows, similar to the rows on the cylinder 15. The lower cylinder 21 is provided with a plurality of depressions 23 arranged in rows on the periphery thereof, and adapted to coincide with the die members 22 of the upper cylinder 20 when the two cylinders are rotated.

The means 14 for cutting the relatively wide metal sheet into the long continuous strips also comprises two cylinders 30 and 31, the upper cylinder 30 being provided on its periphery with a plurality of cutting blades 32. The lower cylinder 31 is also provided with a plurality of cutting surfaces 34 adapted upon rotation of the two cylinders 30 and 31 to coincide with the cutting surfaces 32 of the upper cylinder 30. These cutting blades or surfaces are so arranged that the metal sheet will be cut continuously through the center of the elongated openings formed in the sheet metal, and also will be cut between the rows of elongated openings to thereby form strips having notches extending from one edge thereof.

All three sets of cylinders forming the means 12, 13, and 14 are journalled for rotation within the body portion 10, or more specifically in the side members 10a. Each cylinder may be mounted in any convenient manner, as for instance, by means of shafts passing through the cylinders and rotating therewith, or by means of hubs formed integral with the end walls of the cylinders. In this particular modification, the cylinders are shown as mounted on shafts extending through each cylinder. For instance the cylinders 15 and 16 forming the means 12 are mounted on the shafts 15a and 16a respectively, while the cylinders 20, 21, 30 and 31 are mounted on the shafts 20a, 21a, 30a and 31a.

All the cylinders are rotated at the same speed by driving means. In this modification, gears are provided on both ends of the cylinders 15, 16, 20 and 21, forming the means 12 and 13. The gears 15b at either end of the cylinder 15 are adapted to mesh with the gears 16b at either end of the lower cylinder 16 (only the rear gear 16b being shown). Also the gears 20b at either end of the cylinder 20 are adapted to mesh with the gears 21b at either end of the lower cylinder 21. At the rear of the machine as viewed in Figs. 1 and 3 an intermediate gear 40 mounted on a shaft 41 journalled in the standards 10, meshes with the lower gears 16b and 21b. The gear 40 is adapted to mesh with a gear 42 mounted on a shaft 43, which shaft is journalled in the standards 11 and to which shaft power may be applied in any known manner. In order to stabilize the operation of the shaft 43, a flywheel 44 is provided and, if desired, power may be supplied to the flywheel 44 by means of a belt connection.

The cutting means 14 has its cylinders 30 and 31 provided with gears 30b and 31b at but the rear end of the cylinders. These cylinders are rotated by means of an intermediate gear 45 which meshes with the lower gears 31b and 21b respectively. It should be noted that in this modification, the gears 15b, 16b, 20b, 21b, 30b, 31b, are all mounted on the shafts 15a, 16a, 20a, 21a, 30a, 31a, respectively.

Upon rotation of the shaft 42 motion is transmitted to the six cylinders through various intermediate gears 43, 40 and 45 and the several gears attached to the cylinder shafts. It should be noted that the gears are provided at both ends of the cylinders 15, 16, 20 and 21 in order to equalize the driving which is applied to the said cylinders.

Figures 6, 7:
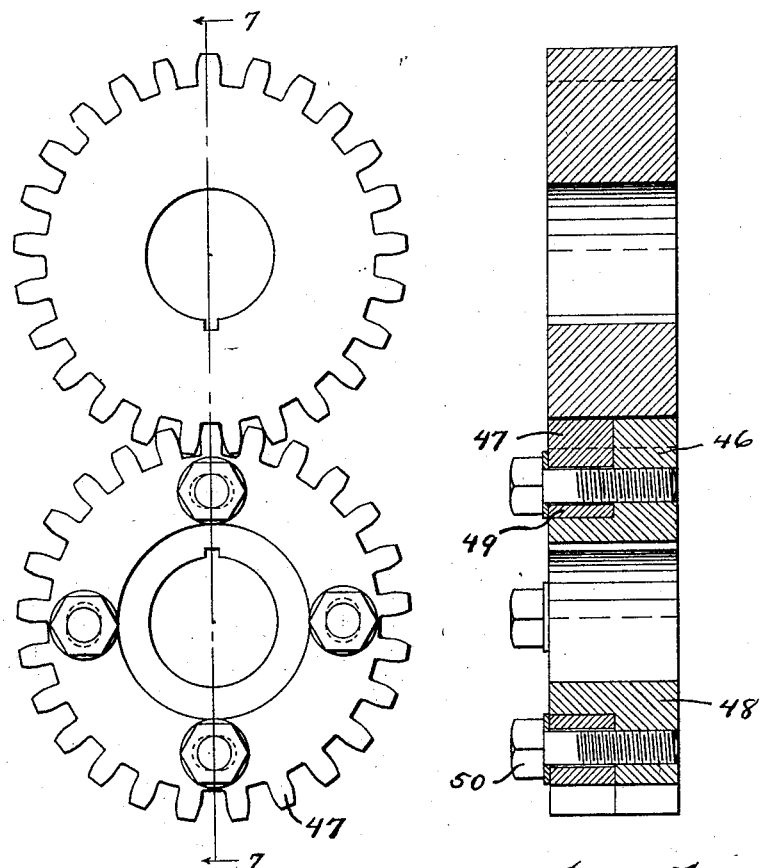
Fig. 6 is an enlarged detailed view in elevation of a pair of gears used on the apparatus.
Fig. 7 is a view in vertical section taken on the line 7—7 of Fig. 6.

In order to further equalize the power applied to the shaft and to positively assure complete and even distribution of power, each set of gears, for instance gears 15b, 16b, 20b, 21b, 30b and 31b is provided with adjusting mechanism for compensating for any wear on the surface of the gear teeth. To this end as shown in Figs. 6 and 7 the lower gear of each set comprises two sets of teeth, one set 46 being fixed and a second set 47 being movable. Teeth 46 form part of the body portion 48 which is fixed on the shaft passing through the cylinder. Teeth 47 on the other hand are mounted on the body portion 49 which is slidably mounted on the body portion 48. Bolts or screws 50 are provided for fixing the movable portion 49 in position on the stationary portion 48. Any play therefore between the gear teeth of the upper and lower gears may be eliminated by moving the teeth 47.

Figure 2:
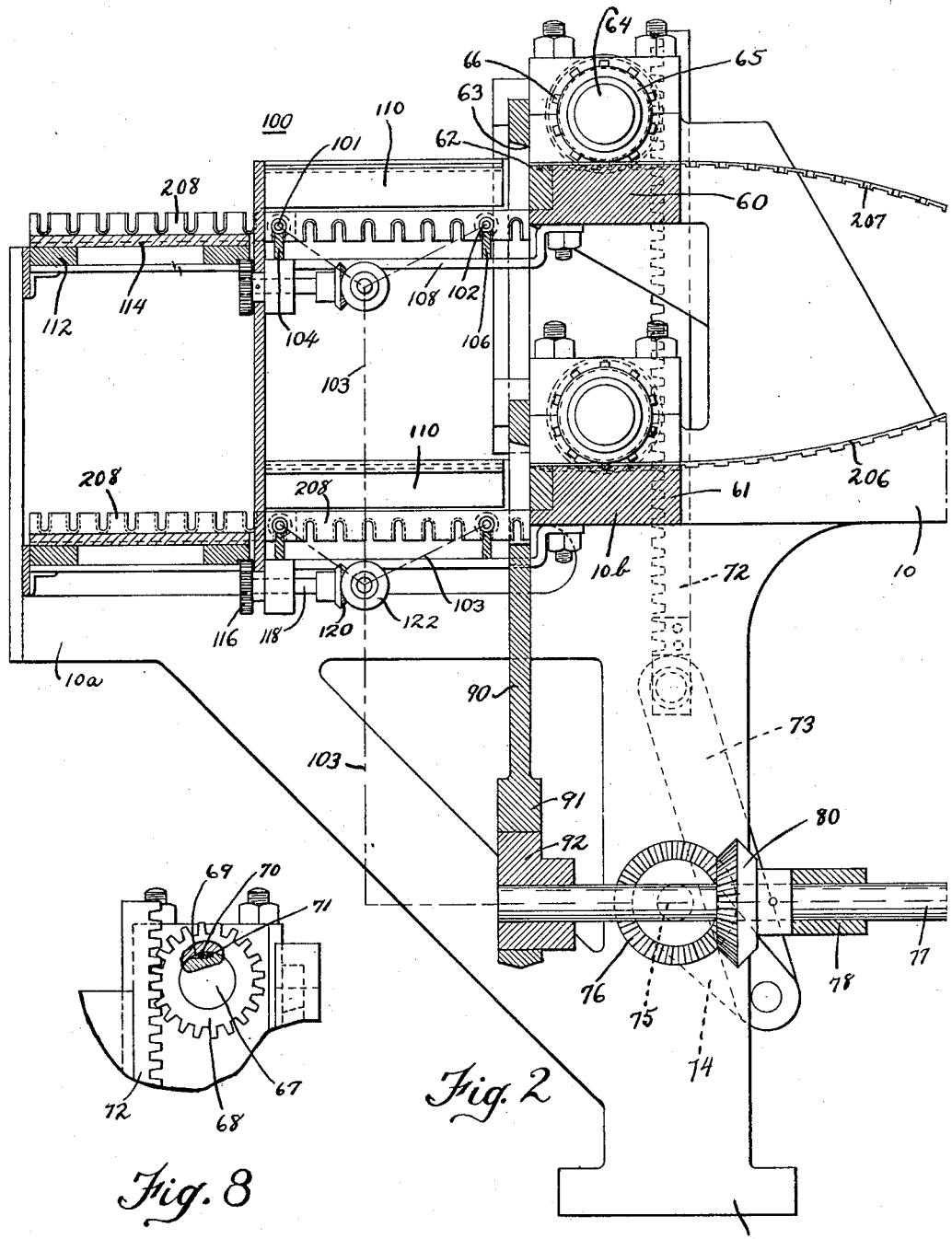
Fig. 2 is a view similar to Fig. 1 of another section of the same machine.
Figure 4:
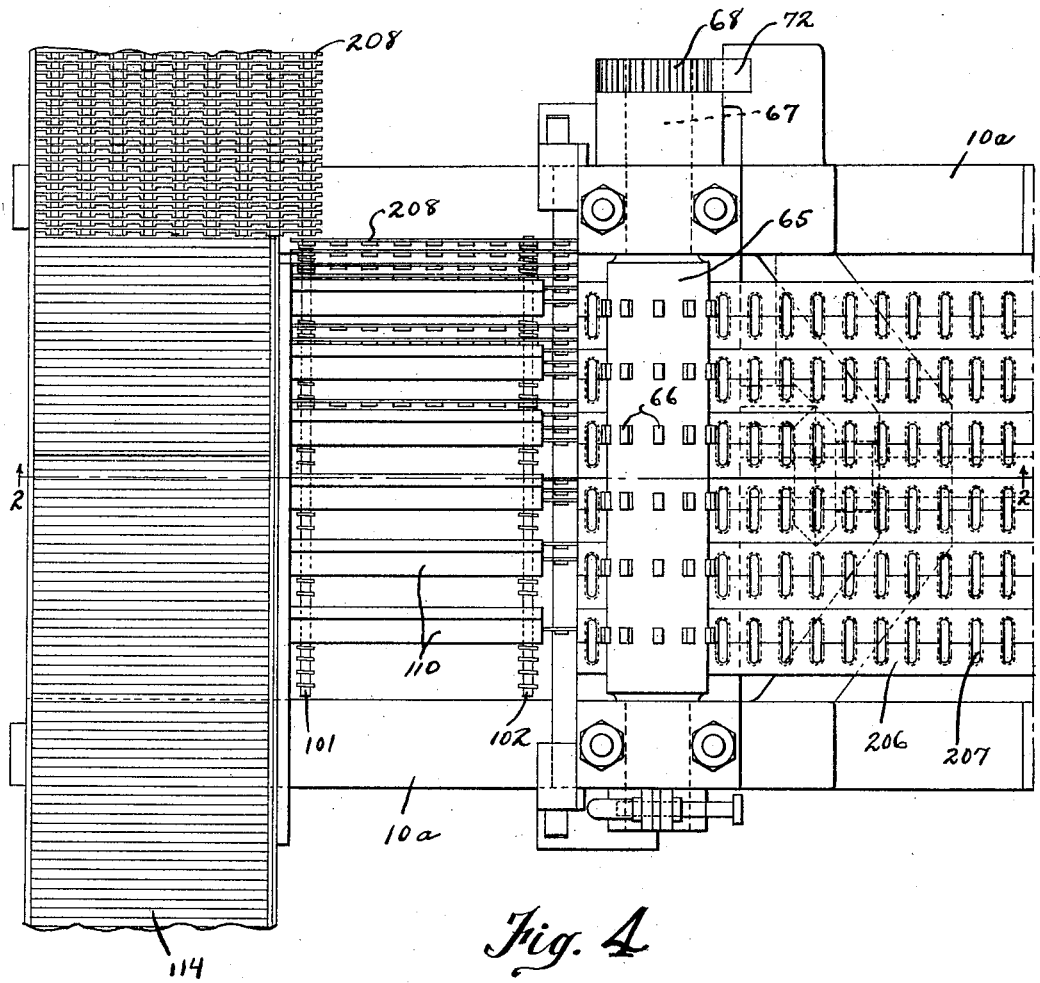
Fig. 4 is a plan view of the section of the machine shown in Fig. 2.
Figure 5:
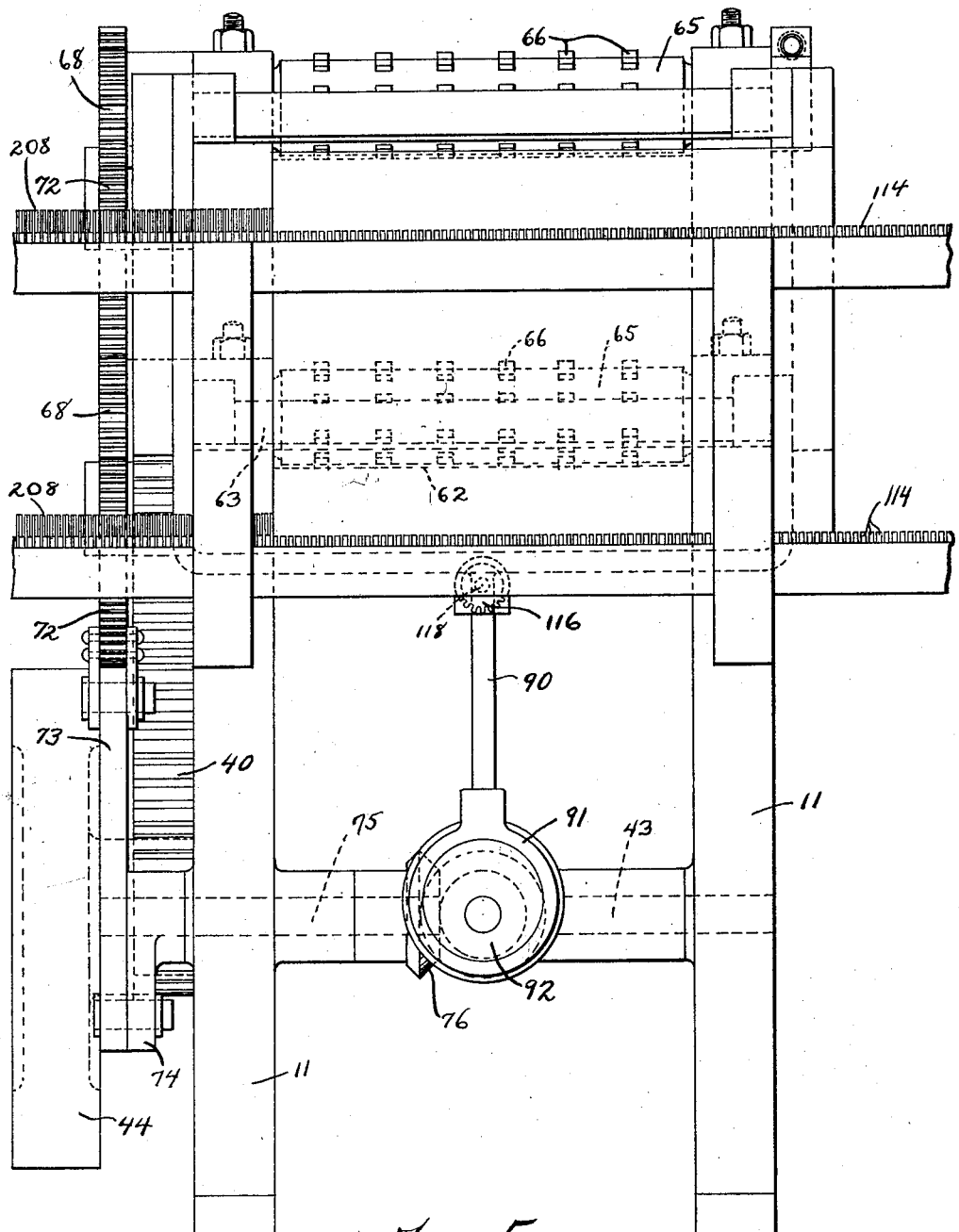
Fig. 5 is a view in end elevation of the left hand end of the machine.

The left hand end of a machine is shown in Figs. 2 and 4. It should be understood, however, that the machine is a unitary structure and has been divided as shown in Figs. 1 and 2, for example, merely for a better understanding thereof. The metal sheet after it has been operated on by the means 12 and 13, is cut into long continuous strips by the means 14 as described above. These long strips are then divided, that is to say each alternate strip passes to the upper platform 60 and another set passes to the lower platform 61. Each of these platforms is identical, as are all the remaining steps of the process and for that reason the operations and the apparatus for performing the operations will be described with reference to but one set of the continuous strips. The platform 60 comprises the particular place where the long continuous strips are cut into fins of the proper length. For instance, if the machine is operating to make fins for a condenser similar to that shown in Fig. 9, then the fins are cut to the size shown in Figs. 13 and 14.

The means for cutting the continuous strips into short lengths comprises a platform 60 having a cutting edge 62 and a cutting blade 63 and means 64 for feeding the proper lengths of the strips onto the cutting surface.

The feeding means 64 comprises a cylinder 65 provided on its periphery with a plurality of extensions 66 adapted to register with the notches in the fins when the cylinder 65 is rotated. At one end of the cylinder there is provided an extension shaft 67 on which is mounted a gear 68. This gear 68 is mounted to drive the shaft 67 and consequently the cylinder 65 in a clockwise direction only, and is free to move in a counter-clockwise direction on the shaft 67 without imparting motion thereto. To this end the shaft 67 is provided with a cut-away portion 69 having therein a bearing 70 pressed outwardly by the spring 71. Movement of the gear 68 in a clockwise direction, or in a counter-clockwise direction as viewed in Fig. 8, since Fig. 8 shows the machine turned through an angle of 180°, will cause the bearing 70 to engage within the left hand end of the cut-away portion 69, thereby clutching the gear 68 to the shaft 67. Movement of the gear 68 in the opposite direction, however, will roll the ball against the tension of the spring 71 to disengage the gear from the shaft.

Means are provided for rotating the gear 68, which means, in this embodiment, comprises a rack bar 72 adapted to mesh with the gear 68. The lower end of the rack bar 72 is pivoted to the link 73 which in turn is pivoted to the crank 74, keyed to the shaft 75 of the gear 76. The shaft 77 is journalled for rotary motion in the bearing 78 forming part of the cross member 10b of the body portion 10 and is provided at one end with a gear 79 (Fig. 1) meshing with the gear 42. Mounted on this shaft is a gear 80 meshing with the gear 76 and adapted to transmit motion thereto. Rotation of the shaft 77 causes rotation of the gear 80 which in turn rotates the gear 76. Rotation of the gear 76 causes upward and downward movement of the link 73, which in turn raises and lowers the rack bar 72. Upward movement of the rack bar 72 causes the gear 68 to rotate about the shaft 67 without imparting motion to the shaft, as stated above. Downward movement of the rack bar 72, however, will cause the gear 68 to rotate in a clockwise direction, thereby engaging the shaft 68 and rotating the cylinder 65 in a clockwise direction. Rotation of the cylinder 65 causes the extensions 66 to engage the notches of the metal strips, thereby moving the strips to the left onto the platform 60.

The cutting of the strips into the proper lengths is accomplished, as before stated, by means of the cutting blade 63 and the cutting surface 62. The cutting surface 62 is stationary, while the cutting blade 63 is moved upwardly and downwardly by means of the connection 90, which connection at its lower end is provided with a sleeve 91 fitting over the cam 92 keyed to the shaft 77. The cam 92 is constructed to impart rapid downward and upward movement to the cutting blade 62 and to hold the blade 63 in its uppermost position during the greater part of one revolution of the shaft 77.

It should be understood that the rack bar 72 is timed to move the cylinder 65 in a clockwise direction while the cutting blade 63 is held in its uppermost position. While the cutting blade 63 is actually moving downwardly past the cutting surface 62, the rack bar 72 will be stationary or at least moving in an upward direction.

Just to the left of the platform 60, as viewed in Figs. 2 and 4 the machine is provided with means for receiving the strip fins cut to the proper lengths and with means for arranging and stacking these strip fins in a rack in condition to receive the tubing to form the condenser. This means is generally indicated at 100 and comprises two screw conveyors 101 and 102, which conveyors are driven from the shaft 77 by means of any suitable connections shown diagrammatically at 103. These conveyors are mounted in bearings 104 and 106 respectively, which bearings are mounted on supporting members 108 secured to or forming a part of the body portion 10 of the machine. Above the conveyors 101 and 102 there are provided a plurality of guides or baffles 110 onto which the strip fins fall after they have been cut from the continuous strip metal by means of the cutting blade 63. The upper cutting means 64 accommodates six separate strips of metal and consequently six inclined baffles 110 are provided as shown in Fig. 4 to direct the strip fins onto the screw conveyor. At the rear end of the screw conveyors, the shaft of conveyor 101 is made slightly larger than the notch provided in the strip fin so that the shaft will grip each strip fin when it arrives at this point and will rotate it through 180° onto the conveyor 112 containing the rack 114 for the reception of the strip fins. These racks 114 are supported on a traveling conveyor 112 which may take the form of an endless belt conveyor. The belt conveyor is also driven from the shaft 77 by means of a gear 116 mounted on a shaft 118 which in turn is provided with a second gear 120 meshing with a gear 122 on the connection 103.

The operation of the device is as follows. Power is applied to the shaft 43, or to the flywheel 44 as stated above. This will cause rotation of the various gears, shown in Fig. 1 of the drawings, causing the three upper cylinders of the means 12, 13 and 14 to move in a clockwise direction and the three lower cylinders of the means 12, 13 and 14 to move in a counter-clockwise direction. At the same time rotation of the shaft 77 will cause upward and downward movement of the rack bar 72 and the cutting blade 63. Rotation of the shaft 77 will also cause, through the connections 103, rotation of the screw conveyors 101 and 102. At the same time the belt conveyor 112 will likewise move due to the connection to the gear 120 through the shaft 118. A relatively wide sheet of metal as indicated at 200 is then fed into the right hand end of the machine between the two cylinders 15 and 16 and the rotation of cylinders 15 and 16 will move the metal sheet 200 to the left and the die members 17 will successively remove from the metal sheet a series of rows of elongated openings 201 as shown more clearly in Fig. 3. As the metal sheet 200 moves to the left it passes between cylinders 20 and 21, rotation of which cylinders will cause the edges of the elongated openings 201 to be turned downwardly to form the flanges 202. Further movement of the metal sheet 200 to the left will cause the metal sheet 100 to pass between the cylinders 30 and 31, where it will come in contact with the cutting blades 32 and 34 which are, in this case, so arranged as to cut the metal sheets into strips by cutting longitudinally between the elongated openings 202 as shown at 203 and by cutting between the rows of openings as shown at 204, Fig. 3. After the metal sheet has passed between the cylinders, forming the means 12, 13 and 14, and after it has been cut into strips 206, having the inwardly extending notches 207 for instance, into 12 strips as shown in the modification, the strips 206 are divided into two sets, one set being led to the upper platform 60 and the other set being led to the lower platform 61. The remaining operations upon the upper and lower sets of strips are identical and consequently the operations performed upon but one single set will be described. One set of strips is fed between the platform 60 and the cylinder 65 so that the extension 66 will engage in the notches 207 which have been formed by the cutting means 14. As the shaft 77 rotates, the rack bar 72 through the intermediate connections such as the link 73 and the crank 74, will be moved upwardly. This upward movement of the rack bar 72 will cause the gear 68 to rotate in a counter-clockwise direction around the shaft 67 without imparting motion to the cylinder 65. This will be due to the fact that the bearing 70 will not cause the gear 68 to clutch the shaft 67. During the upward movement of the rack bar 72 the various strips 206 which are being fed to the platform 60 will sag between the platform 60 and the cutting means 14. This is due to the fact that during the upward movement of the rack bar 72, the metal strips 206 are not being fed onto the platform 60, but the means 12, 13 and 14 continue to operate. When the rack bar 72 moves in a downward direction, the gear 68 moves in a clockwise direction and the bearing 69 causes the gear 68 to clutch the shaft 67, thereby moving the cylinder 65 in a clockwise direction. Movement of the cylinder 65 in a clockwise direction causes the extension 66 to engage the notches 207 in the strips 206, to move the strips 206 rapidly to the left over the cutting surface 62 and under the cutting blades 63 onto the means 100. After the rack bar 72 has reached its lowermost position, or during its upward movement, that is to say, after the rotation of the cylinder 65 has moved the strips 206 onto the platform forming the means 100, the cutting blade 63 moves rapidly downwardly and then upwardly due to the particular shape of the cam 92 mounted on the shaft 77. The downward movement of the cutting blades 63 cuts through the strips 206 to form strip fins 208 of the proper length as predetermined to fit the desired condenser. During the movement of the strips 206 over the cutting surface 62 due to the rotation of the cylinder 65, the strips 206 rest upon the guides 110 and rest thereon until after the cutting blade 63 has moved downwardly. As soon as the strips 206 are cut into strip fins 208 of the proper length, the said fins 208 slide downwardly over the guides 110 to the screw conveyors 101 and 102 in such a manner that the notches 207 engage the screw conveyors between the threads thereof. Both screw conveyors as before stated are rotated by means of connection 103 to the shaft 77 so that the strip fins 208 are moving slowly to the rear of the machine as shown in Fig. 4. The rear end of the shaft of screw conveyor 101, that is to say, the conveyor nearest the outlet end of the machine, is enlarged so that the shaft of the conveyor will grip the notch 207 and will thereby rotate the fin 208 through an arc of 180°. During this time the belt conveyor 112 is also moving slowly to the rear of the machine as viewed in Figs. 2 and 4. This belt conveyor contains a plurality of racks 114 having a plurality of guides or slots into which the strip fins 208 are thrown by the screw conveyor 101. The strip fins 208 are arranged in the racks 114 with the notches 207 extending upwardly. The racks 114, as fast as they are completely filled with the strip fins 208, may be removed from the belt conveyor 114 and placed in a machine such as a punch press. In this machine or punch press, the condenser tubing, for example, a condenser tubing which has been bent into the form of a serpentine coil, as shown at 300 in Fig. 9, may be placed over the strip fins 208 so that the straight portions 301 of the serpentine 300 will coincide with the upwardly extending notches 207 of the strip fins 208. Downward movement of the punch will force the tubing 301 into the notches 207. The end members 303 may then be placed on the condenser by lateral movement or by sliding over the reverse bends 304. The condenser as thus assembled may then be dip soldered to provide a completed condenser.

It should be noted that the various operations of the component parts of the machine are so timed that the metal strip 200 entering the inlet end of the machine will be continuously operated upon to produce strip fins 208 of the proper length of the outlet end of the machine. Cylinders 15, and 16, 20 and 21, 30 and 31, must all rotate at the same speed while the downward movement of the rack bar 72 must be timed to take place when sufficient amount of the strips have accumulated between the platform 60 and the means 14. Also the downward movement of the cutting blade 63 passing the cutting surface 62, should be timed to take place while the rack bar 72 is at its lowermost point or at least while the rack bar 72 is moving upwardly.

The movement of the screw conveyors 101 and 102 should also be timed, so that between successive operations of the cutting blade 63, the conveyors 101 and 102 will have made six complete revolutions.

In Figs. 9 to 14 inclusive the particular strip fins produced by this machine have been illustrated. They include the body portion having the inwardly extending notches 207 extending from one edge thereof and having the edges of the notches 201 bent to form flanges 202. In Figs. 10 and 11 the strip fins are shown as constructed for a single pipe condenser and have been made as above described by cutting longitudinally through the center of the elongated openings and between the rows of openings. In Fig. 12 a fin structure for use with a double pipe condenser has been illustrated. This is made by cutting longitudinally through the rows of openings, and by not cutting through between the openings. Obviously the fin structures shown in Fig. 12 could be made but with slight modification of the cutting means 14.

While I have described a machine capable of acting on a sheet of metal to provide strip fins having notches extending from one edge thereof, it is obvious that other types of fins could be manufactured without departing from the scope of the method disclosed. For example, by eliminating the blades of the means 14 which cut between the rows of openings, a strip fin similar to that shown in Fig. 12, wherein the notches extend inwardly from both edges thereof, could be made.

Also the machine would operate equally as well on a strip of metal which has already been cut to the width of the desired strip fin. It could be a continuous strip which could be cut into the proper lengths by the cutting blade 62, or the strips could be cut into the desired lengths before passing between the cylinders 15 and 16. If desired, a strip or a sheet could be acted upon so as to produce longitudinal elongated openings or circular openings in place of the lateral elongated openings, to provide strip fins having openings long enough to receive the bent edges 304 of the coil 300 shown in Fig. 9. The fins could then be mounted on the serpentine coil 300 by slipping endwise over the reverse bends 304 instead of the lateral movement disclosed in the side entry type of condenser.

While the form of embodiment of the invention as herein disclosed constitutes a preferred form, it is to be understood that other forms might be adopted, all coming within the scope of the claims which follow.

What is claimed is as follows:

1. The method of manufacturing strip fins for use in the manufacture of heat-exchange elements which comprises removing sections from a sheet of metal to form rows of openings therein, forming a plurality of continuous strips by cutting longitudinally through the rows of openings, cutting said strips into fins and stacking said fins with their sides in parallel relation.

2. The method of manufacturing strip fins for use in the manufacture of heat exchange elements which comprises removing sections from a sheet of metal to provide parallel rows of openings therein, bending back the edges of the openings to form flanges and cutting the sheet metal longitudinally through the rows of openings and between the rows of openings to provide continuous strips.

3. The method of manufacturing strip fins for use in the manufacture of heat exchange elements which comprises removing sections from a sheet of metal to provide parallel rows of openings therein, bending back the edges of the openings to form flanges and cutting the sheet metal longitudinally through the rows of openings and between the rows of openings to provide continuous strips and cutting the continuous strips into strip fins of the proper length.

4. The method of manufacturing strip fins for use in the manufacture of heat exchange elements which consists in removing sections from a sheet of metal to provide a row of opening therein, bending back the edges of the openings to form flanges and forming a plurality of continuous strips by cutting sheet metal longitudinally through the row of openings.

5. The method of manufacturing strip fins for use in the manufacture of heat exchange elements which comprises removing transversely elongated sections from a sheet of metal to form a row of elongated openings therein, bending back the edges of the openings to form flanges, and forming a plurality of continuous strips by cutting longitudinally through the row of openings substantially as described.

6. The method of manufacturing strip fins for use in the manufacture of heat exchange elements which comprises removing transverse elongated sections from a metal sheet to form parallel rows of openings therein, bending back the edges of the openings to form flanges, forming a plurality of continuous metal strips by cutting longitudinally through the rows of openings and between the rows of openings and forming strip fins by cutting the continuous strips into shorter lengths.

7. The method of manufacturing strip fins for use in the manufacture of heat exchange elements which comprises removing transverse elongated sections from a metal sheet to form parallel rows of openings therein, bending back the edges of the openings to form flanges, forming a plurality of continuous metal strips by cutting longitudinally through the rows of openings and between the rows of openings and forming strip fins by cutting the continuous strips into shorter lengths and stacking the strip fins in a rack in readiness for the reception of a heat exchange tube.

8. A machine for use in the manufacture of finned condensers including means for removing laterally extending elongated sections from a metal sheet to form rows of elongated openings, means for bending back the edges of the openings to form flanges and means for forming a plurality of continuous strips including means for cutting the metal sheet longitudinally through the rows of openings and between the rows of openings.

9. A machine for manufacturing strip fins for use in the manufacture of heat exchange elements which includes rotary means for continuously removing sections from a sheet of metal to form a row of openings therein, means for forming a plurality of continuous strips including rotary means for cutting the sheet of metal longitudinally through the row of openings, means for cutting said strips into fins and means for automatically stacking said fins with their sides in parallel relation.

10. A machine for manufacturing strip fins for use in the manufacture of heat exchange elements which includes rotary means for continuously removing sections from a sheet of metal to form a row of openings therein, rotary means for bending back the edges of the openings to form flanges, means for forming a plurality of continuous strips including rotary means for cutting the sheet of metal longitudinally through the row of openings.

In testimony whereof I hereto affix my signature.

GEORGE R. AULD.